United States Patent [19]

Kamleitner

[11] Patent Number: 4,548,182
[45] Date of Patent: Oct. 22, 1985

[54] TIMING DEVICE

[75] Inventor: Ewald Kamleitner, Friedrichshafen, Fed. Rep. of Germany

[73] Assignee: MTU Friedrichshafen GmbH, Fed. Rep. of Germany

[21] Appl. No.: 598,797

[22] Filed: Apr. 10, 1984

[30] Foreign Application Priority Data

May 18, 1983 [DE] Fed. Rep. of Germany ....... 3318024

[51] Int. Cl.$^4$ ............................................ F02M 59/20
[52] U.S. Cl. .................................. 123/501; 123/502; 464/2; 464/3
[58] Field of Search ................. 123/501, 502; 464/2, 464/3, 7

[56] References Cited

U.S. PATENT DOCUMENTS

| 3,654,776 | 4/1972 | Ginger et al. | 123/501 |
| 4,132,202 | 1/1979 | Nakayama et al. | 123/501 |
| 4,250,859 | 2/1981 | Scheying | 123/501 |

FOREIGN PATENT DOCUMENTS

| 240933 | 10/1962 | Australia | 123/501 |
| 944909 | 6/1956 | Fed. Rep. of Germany | 123/501 |
| 1113609 | 9/1961 | Fed. Rep. of Germany | 123/501 |
| 2649986 | 5/1978 | Fed. Rep. of Germany | 123/502 |
| 505074 | 5/1939 | United Kingdom | 123/501 |

Primary Examiner—Magdalen Y. C. Moy
Attorney, Agent, or Firm—Craig and Burns

[57] ABSTRACT

To avoid the lifting off and re-impacting of the flyweights (13) of a fuel injection timing device on their associated slide surfaces (14, 15) during the occurrence of a negative torque, it is proposed to transmit a part of this torque by an oil film. For this purpose, lubricating oil from the internal combustion engine flows through the timing device. At least one of the flyweights (13) cooperates as a transmission element (21) with a slide member (22) and with the two coupling parts (11, 12) whereby slide surfaces (23-28) with areal abutments are provided between the parts, between which an effective oil film can form.

6 Claims, 2 Drawing Figures

TIMING DEVICE

FIELD OF THE INVENTION

The present invention relates to a timing device for the injection pump of piston driven internal combustion engines, in which the positive driving torque required by the pump during injection, is transmitted between two clutch parts by a plurality of flyweights which are each arranged between two respective slide surfaces coordinated to the clutch parts and which vary as a function of rotational speed the angular position between the two clutch parts and therewith the start of the fuel injection.

BACKGROUND OF THE INVENTION

During the injection operation, the torque of the pump causes a delay of the pump mass with simultaneous elastic stressing of the drive shaft connection of the pump. After the injection operation, the pump mass is again accelerated under equalization of the stressing of the drive shaft connection. The problem with conventional arrangements is that when the flyweights reach the rotational velocity of the pump drive they are lifted off from the slide surfaces and abut the slide again during the next injection operation. This relieving of the surfaces sliding one on the other is desirable in order to achieve, along with small rotational speed changes, a movement of the flyweights along the slide surfaces and therewith a change of the injection start. Return springs oppose the lifting off, which are arranged between the two clutch parts and whose force is directed opposite the centrifugal force of the flyweights.

If one presupposes an existing pump mass and elasticity of the drive connection, then the negative torque acting back from the injection pump on the internal combustion engine is dependent on the magnitude of the torque necessary during the injection operation and on the magnitude of the injection pressure. When exceeding a predetermined injection pressure, the repeated lifting-off with corresponding re-impacting of the flyweights on the slide surfaces becomes so deleterious that the slide surfaces are destroyed after a relatively short time of operation.

It is possible to counteract the lifting off by an increase of the force of the return springs. This, however, reduces the useful working capacity of the timing device so that flyweights with greater mass and correspondingly with a larger structural volume are necessary for the timing device in order to obtain again the original working capacity.

Timing devices are known in which both the flyweights in the one clutch part as well a the slide members connected therewith are guided in corresponding grooves of the other clutch part. In these prior art timing devices the positive and also the negative torques are transmitted by abutment of the slide members and of the flyweights at the corresponding groove flanks. The manufacture of such timing devices, however, is relatively costly and curved grooves with slight clearance or play of the slide members for achieving predetermined injection characteristics can be realized only with difficulty.

SUMMARY AND OBJECTS OF THE INVENTION

It is therefore the object of the present invention to counteract the lifting off of the flyweights from their slide surfaces in the timing devices of simple construction described hereinabove.

The underlying problems are solved according to the present invention in that a part of the negative torque occurring between the actual injection operations of the injection pump is transmitted by oil films which can form between two mutually matched surfaces that are coordinated to the clutch parts and transmission parts arranged between the clutch parts.

As a result thereof, a part of the negative torque is transmitted by the adhesion forces between the surface and the oil film and by the cohesion forces within the oil film. The other part of the negative torque is absorbed, as heretofore, by the force of the return springs. As has been determined by tests and measurements, the negative torque is absorbed thereby for the most part so that the undesired lifting off of the flyweights with the described consequences does not occur, yet an adjustment of the flyweight takes place nevertheless with small rotational speed differences.

An advantageous embodiment of the present invention is achieved by the combination of the following features:

(a) The timing device includes a housing surrounding both clutch parts, into which lubricating oil of the internal combustion engine enters by way of a bore provided in a shaft of the timing device, which after flowing through the timing device is again forced out of the housing by way of a sealing gap; and (b) At least one of the flyweights of the timing device is constructed as a transmission member for the negative torque and cooperates with a slide member whereby the associated slide surfaces of the clutch parts, of the transmission member and of the slide member form among each other areal abutments so that effective oil films can result between the same.

The formation of the oil films between the surfaces is assured in a simple manner by means of these features and the heat resulting from the torque transmission can be removed without problems. By changing the size of the participating surfaces and by varying the number of the flyweights acting as transmission members, the transmitted negative torque can be finally adjusted. Additionally, the oil present in the timing device also dampens the high frequency vibrations of the gearing drive. An increase of the structural space of existing timing devices is generally avoided by the present invention.

These and other objects, features and advantages of the present invention will become more apparent from the following description when taken in connection with the accompanying drawing which shows, for purposes of illustration only, one embodiment in accordance with the present invention, and wherein:

DETAILED DESCRIPTION OF THE PREFERRED EMBODIMENT

Figure 1:
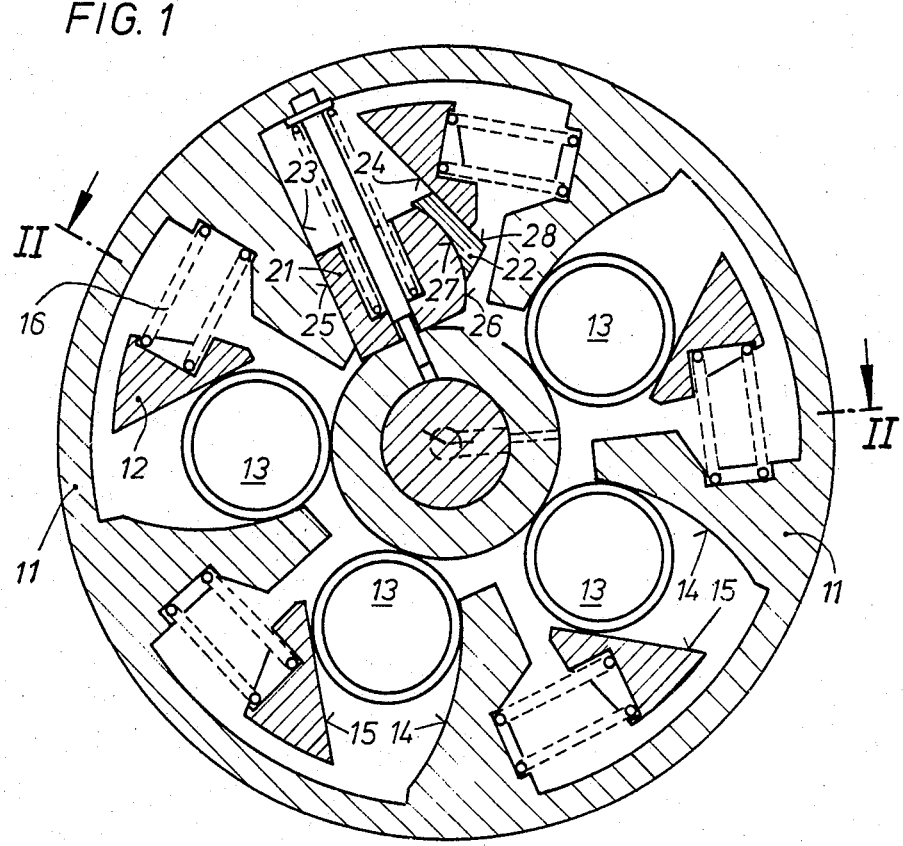
FIG. 1 is a cross-sectional view through a timing device with an arrangement of the flyweights and transmission members in accordance with the present invention and FIG. 2 is a longitudinal cross-sectional view of a timing device in accordance with the present invention, taken along line II—II of FIG. 1.
Figure 2:
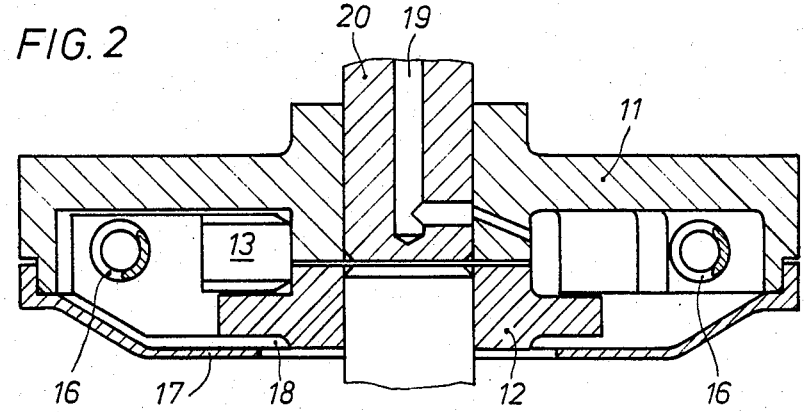

Referring now to the drawing wherein like reference numerals are used throughout the two views, the timing device illustrated in these figures for the injection pump of a piston driven internal combustion engine includes a clutch part 11 connected with the piston driven internal combustion engine, a clutch part 12 connected with the injection pump and flyweights 13. Each of the flyweights 13 are arranged between two slide surfaces 14 and 15 which are coordinated to the clutch parts 11 and 12, respectively.

With an increasing rotational speed, the flyweights 13 move outwardly as a result of the centrifugal force acting on the same and change the angular position of the two clutch parts 11 and 12 relative to one another in accordance with the shape of the slide surfaces 14 and 15. Return springs 16 act opposite the centrifugal force and press the clutch parts, respectively, slide surfaces against the flyweights.

According to the present invention, the timing device includes a housing part 17 connected with the one clutch part 11, which surrounds the other clutch part 12 and forms therewith a sealing gap 18. Lubricating oil from the internal combustion engine reaches the timing device housing resulting therefrom by way of a bore 19 in the shaft 20 of the timing device, which after flowing through the timing device, is again forced out of the housing by way of the sealing gap 18. Additionally, one of the flyweights of the timing device is constructed as a transmission member 21 which cooperates with a slide member 22. Associated slide surfaces 23 and 24 of the clutch parts, slide surfaces 25 and 26 of the transmission member 21 and slide surfaces 27 and 28 of the slide member 22 from among each other areal abutments, between which an oil film can form which is effective for the transmission of the negative torque.

During the occurrence of negative torques, two of the surfaces 23/25, 26/27 or 24/28 adhering to one another by way of oil films must be separated from one another prior to a lifting off of the flyweights 13 from their surfaces 14 and 15. Since relatively large forces are necessary therefor, a lifting off of the flyweights from their slide surfaces and the subsequently re-impacting of the flyweights on the slide surfaces can be practically completely avoided in conjunction with the return springs.

While I have shown and described only one embodiment in accordance with the present invention, it is understood that the same is not limited thereto but is susceptible of numerous changes and modifications as known to those skilled in the art, and I thefore do not wish to be limited to the details shown and described herein but intend to cover all such changes and modifications as are encompassed by the scope of the appended claims.

I claim:

1. A timing device for an injection pump of piston driven internal combustion engines comprising two clutch parts, a plurality of flyweight means for transmitting the positive driving torque required by the pump during injection, and further means for transmitting at least a part of the negative torque occurring between injection operations by an oil film, each of said plurality of flyweight means being arranged between two respective slide surface means coordinated to the clutch parts and being operable to vary the angular position between the two clutch parts and therewith the start of fuel injection in dependence on the rotational speed, said further means generally counteracting lifting off of the plurality of flyweight means from respective slide surface means.

2. A timing device according to claim 1, wherein the further means includes transmission means between the clutch parts and mutually matched surface means coordinated to the clutch parts and the transmission means, the oil films forming between two mutually matched surface means.

3. A timing device according to claim 2, wherein the timing device includes a housing part connected with one of the clutch parts, surrounding the other clutch part and forming therewith a timing device housing provided with a sealing gap, lubricating oil of the internal combustion engine reaching said housing by way of a bore in a shaft of the timing device, said lubricating oil being forced out of the housing after flowing through the timing device by way of the sealing gap.

4. A timing device for an injection pump of piston driven internal combustion engines comprising two clutch parts, a plurality of flyweight means for transmitting the positive driving torque required by the pump during injection, and further means for transmitting at least a part of the negative torque occurring between injection operations by an oil film, each of said plurality of flyweight means being arranged between two respective slide surface means coordinated to the clutch parts and being operable to vary the angular position between the two clutch parts and therewith the start of fuel injection in dependence on the rotational speed, the further means including transmission means between the clutch parts and mutually matched surface means coordinated to the clutch parts and the transmission means, the oil films forming between two mutually matched surface means, said further means generally counteracting lifting off of the plurality of flyweight means from respective slide surface means, a housing part connected with one of the clutch parts, surrounding the other clutch part and forming therewith a timing device housing provided with a sealing gap, lubricating oil of the internal combustion engine reaching said housing by way of a bore in a shaft of the timing device, said lubricating oil being forced out of the housing after flowing through the timing device by way of the sealing gap, said transmission means being formed by at least one of the flyweight means constructed as transmission member for the negative torque and cooperating with a slide member, the associated slide surface means of the clutch parts, of the transmission member and of the slide member, forming among each other areal abutments so that an effective oil film can form therebetween.

5. A timing device according to claim 1, wherein the timing device includes a housing part connected with one of the clutch parts, surrounding the other clutch part and forming therewith a timing device housing provided with a sealing gap, lubricating oil of the internal combustion engine reaching said housing by way of a bore in a shaft of the timing device, said lubricating oil being forced out of the housing after flowing through the timing device by way of the sealing gap.

6. A timing device for an injection pump of piston driven internal combustion engines comprising two clutch parts, a plurality of flyweight means for transmitting the positive driving torque required by the pump during injection, and further means for transmitting at least a part of the negative torque occurring between injection operations by an oil film, each of said plurality of flyweight means being arranged between two respective slide surface means coordinated to the clutch parts and being operable to vary the angular position between the two clutch parts and therewith the start of fuel injection in dependence on the rotational speed, the further means including transmission means between the clutch parts and mutually matched surface means coordinated to the clutch parts and the transmission means, the oil films forming between two mutually matched surface means, said further means generally counteracting lifting off of the plurality of flyweight means from respective slide surface means, said transmission means being formed by at least one of the flyweight means constructed as a transmission member for the negative torque and cooperating with a slide member, the associated slide surface means of the clutch parts, of the transmission member and of the slide member, forming among each other areal abutments so that an effective oil film can form therebetween.

* * * * *